(No Model.)
H. PRYM.
HOOK AND EYE.
No. 500,210. Patented June 27, 1893.
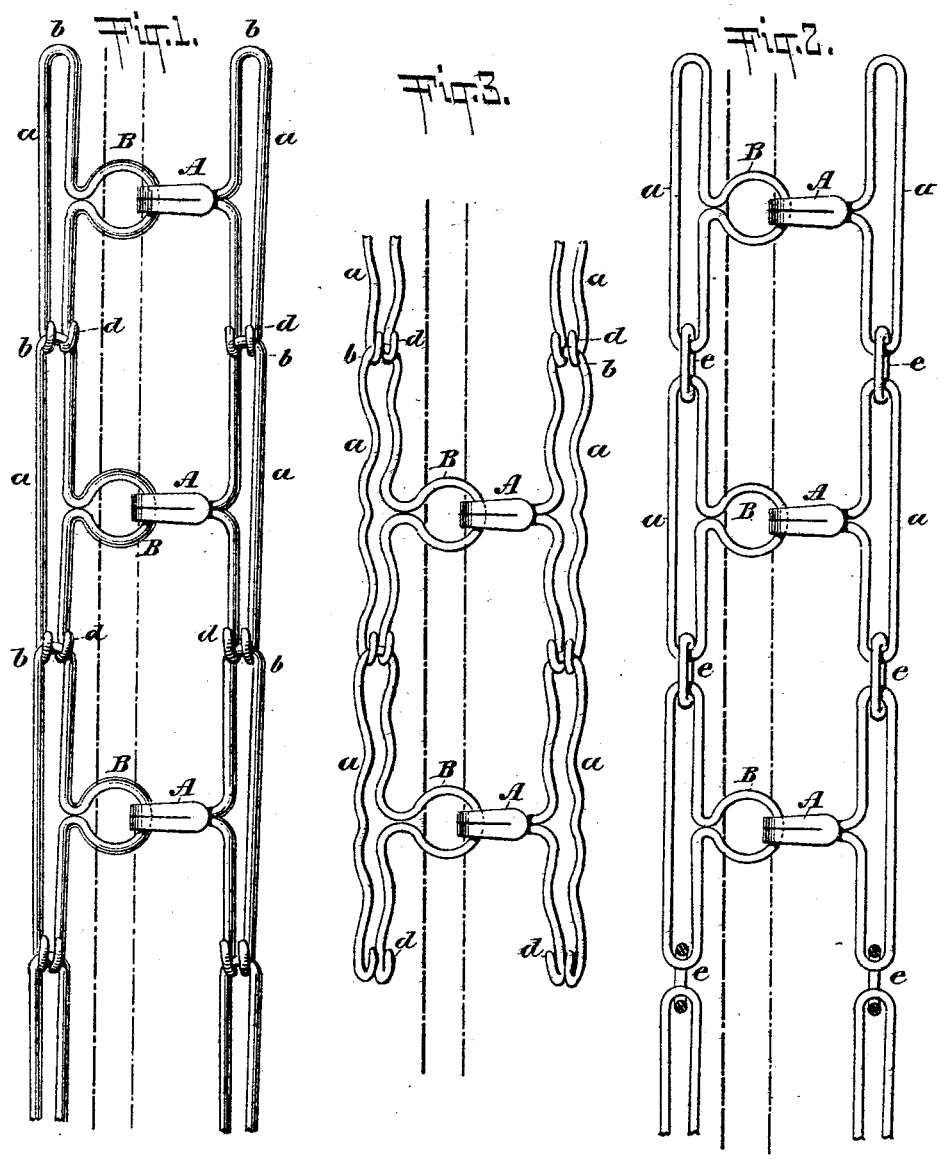
WITNESSES:
Gustave Dietrich
L. M. Wachschlager
INVENTOR
Heinrich Prym,
BY Briesen & Knauth
his ATTORNEYS.

UNITED STATES PATENT OFFICE.

HEINRICH PRYM, OF STOLLBERG, NEAR AACHEN, GERMANY.

HOOK AND EYE.

SPECIFICATION forming part of Letters Patent No. 500,210, dated June 27, 1893.

Application filed December 22, 1892. Serial No. 456,048. (No model.)

*To all whom it may concern:*

Be it known that I, HEINRICH PRYM, a resident of Stollberg, near Aachen, Prussia, Germany, have invented a certain new and useful Improvement in Hooks and Eyes, of which the following is a specification.

This invention relates to hooks and eyes for ladies' dresses, being that class which are known as dress hooks. In dress hooks it is necessary to have rows of hooks and rows of eyes on the lapels or near the edges of the article to which they pertain, and efforts have been heretofore made to provide for the correct spacing of such hooks and eyes by elongating their shanks, by which I mean the portions that are stitched to the garments.

My invention seeks to improve upon existing dress hooks and eyes by uniting them or facilitating their junction into chains, thereby assuring the exact spacing desired and causing each member to be supported by the remainder.

In the accompanying drawings Figure 1 represents a plan view of two chains of hooks and eyes constructed according to my invention. Fig. 2 is a face view of a modification of said invention; and Fig. 3 a face view of another modification.

In the drawings the letter A represents a hook and the letter B the corresponding eye. Each hook has an elongated shank $a$, and each eye has a corresponding elongated shank $a$, the shanks $a$ $a$ of the hooks and eyes being exactly alike, as in Fig. 1. Each of these shanks $a$ forms a loop $b$ at one end and a pair of hooks $d$ at the other end, the arrangement being such, as represented in Fig. 1, that the hooks $d$ at one end of one hook or eye can be passed through the loop $b$ of the shank of the adjoining hook or eye. In this manner, therefore, a continuous chain of hooks and also a continuous chain of eyes are produced; so that therefore the exact desired spacing is obtained, and so that the members of the chain when stitched to the fabric will support and sustain one another.

The shanks $a$ may be substantially straight, as in Fig. 1, or undulating, as in Fig. 3, or of other convenient form.

Instead of forming the hooks $d$ on one end of each shank, I may form both ends of each shank into loops, as in Fig. 2, and unite the adjoining shanks of each chain by short links $e$, in which case a chain connection of hooks and eyes is also produced, but one not as desirable as that represented in Figs. 1 and 3.

Having described my invention, what I claim, and desire to secure by Letters Patent, is—

1. A fastening device of the character described, having an elongated shank $a$, a hook or eye projecting from a side thereof, and the shank $a$ having a hook at one end and means for receiving a hook at the other end, said end hook extending back in the direction of the length of the shank, whereby a chain can be formed, having regularly spaced side hooks or eyes substantially as described.

2. A series of hooks and eyes combined into flexible chains, the hooks and eyes having spacing shanks $a$ secured together, end to end and having side hooks and eyes adapted to fasten the chains together side by side, substantially as described.

HEINRICH PRYM.

Witnesses:
HARRY M. TURK,
E. L. SHERMAN.